United States Patent [19]

Gutov et al.

[11] Patent Number: 4,872,800
[45] Date of Patent: Oct. 10, 1989

[54] UNIT GOODS STORAGE

[76] Inventors: Sergei K. Gutov, ulitsa Ramenka, 7 korpus 1, kv. 76; Dmitry A. Plesser, ulitsa Seleznevskaya, 30, korpus 3, kv. 14; Grigory A. Radutsky, ulitsa Pervomaiskaya, 66, kv. 45, all of Moscow, U.S.S.R.

[21] Appl. No.: 156,915
[22] PCT Filed: Mar. 13, 1987
[86] PCT No.: PCT/SU87/00030
 § 371 Date: Nov. 12, 1987
 § 102(e) Date: Nov. 12, 1987
[87] PCT Pub. No.: WO87/05584
 PCT Pub. Date: Sep. 24, 1987

[30] Foreign Application Priority Data

Mar. 14, 1986 [SU] U.S.S.R. ............... 4033006

[51] Int. Cl.⁴ ............................................. B65G 1/04
[52] U.S. Cl. ................................... 414/278; 187/27
[58] Field of Search ............... 414/278, 331, 285, 277; 187/20, 27; 198/463.3, 586

[56] References Cited

U.S. PATENT DOCUMENTS

| | | | |
|---|---|---|---|
| 2,803,356 | 8/1957 | Thomas | 414/283 |
| 3,842,719 | 10/1974 | Fernandez-Rana et al. | 414/278 X |
| 4,062,458 | 12/1977 | Manini et al. | 414/285 X |
| 4,109,896 | 8/1978 | Ragen | 187/20 X |
| 4,268,207 | 5/1981 | Pipes | 414/277 |
| 4,392,768 | 7/1983 | Van Capelleveen | 414/278 |

FOREIGN PATENT DOCUMENTS

| | | | |
|---|---|---|---|
| 2239078 | 2/1973 | Fed. Rep. of Germany | 187/27 |
| 2543545 | 1/1976 | Fed. Rep. of Germany | . |
| 3003628 | 8/1981 | Fed. Rep. of Germany | 414/277 |
| 2275400 | 1/1976 | France | 187/27 |
| 80022 | 4/1934 | Sweden | 187/27 |
| 569504 | 9/1977 | U.S.S.R. | 414/277 |
| 590193 | 2/1978 | U.S.S.R. | . |

Primary Examiner—David A. Bucci
Attorney, Agent, or Firm—Lilling and Greenspan

[57] ABSTRACT

A unit goods storage includes racks (1) a frame-work (2) of which is made up each of vertical masts giving support to stacks of cantilever shelves (3,4) facing each other with their free sides so as to form vertical passages each containing a horizontal conveyor (5) the ends of the frames of which extend beyond the framework (2). All ends of the frames of the conveyors (5) are interlinked by stiff members (6) so as to form therewith a gridwork (7) capable of displacing up and down the height of the storage under the action of a drive (8).

1 Claim, 3 Drawing Sheets

UNIT GOODS STORAGE

BACKGROUND OF THE INVENTION

The invention relates to storage equipment and has specific reference to unit goods storages.

DESCRIPTION OF THE PRIOR ART

Modern methods of storing unit goods primarily, randomly retrievable goods, give preference to storage facilities of either the gravity or rack type.

Gravity storages, where the shelves must be installed at an angle to the horizontal and equipped with means of retarding the motion of goods, suffer from low economic usage of available space and are of intricate design.

Rack-type storages utilize available space more effectively. So for example, there is known a storage (DE, A, 2,543,545) comprising racks the framework of each of which is made up of vertical masts giving support to stacks of cantilever shelves which face each other with their free sides and are separated by vertical passages. A horizontal individually-driven conveyor extending beyond the framework and capable of up and down displacement is provided in each passage. The vertical drive of every conveyor consists of a system of screw pairs the screws of which are coupled to an electric motor via reduction gears.

Despite an improved space utilization factor, some space must be reserved in the known storage for installing the drives and rendering them accessible for servicing. The individual conveyor drives make the known storage an awkward piece of engineering which is also tedious in operation, for the screws should be constantly kept in synchronism in order to avoid skewing and jamming of conveyors.

SUMMARY OF THE INVENTION

The principal object of the invention is to provide a storage wherein the means for handling goods in the racks is of refined and simplified design which increases economic usage of available space and is simple in operation.

This object is realized by a unit goods storage comprising racks a framework of which is made up each of vertical masts giving support to stacks of cantilever shelves facing each other with their free sides so as to form vertical passages each containing a horizontal conveyor extending beyond the framework at either end and capable of displacing vertically along the height of the framework between the free sides of the shelves. According to the invention the extending ends of conveyor frames are interconnected by stiff members so as to form therewith a gridwork capable of displacement between the free sides of the shelves up and down the height of the storage under the action of a common drive incorporating a drum and ropes which pass over movable and stationary sheaves being attached each to the drum with one end and to the rack with the other end.

The means to handling goods in the racks which is provided in the form of the gridwork serves to join adjacent racks to each other, thereby increasing the total volume of the warehouse which is utilized for storage. The common means of actuating the gridwork which serves to move up and down all conveyors and is provided in the form of sheaves and ropes, is inherently simple and therefore reliable in operation, posing no problems.

It is expedient according to the invention to provide the stiff members in tubular form and run actuating ropes through the bores of the tubular members, whereby the movable sheaves of the gridwork drive are attached to the tubular members and the stationary sheaves are secured to the racks.

This arrangement simplifies the way in which the gridwork is coupled to the drive and permits the height of the warehouse to be fully utilized.

BRIEF DESCRIPTION OF THE DRAWINGS

A preferred embodiment of the invention will now be described by way of example with reference to the accompanying drawings in which.

DESCRIPTION OF THE PREFERRED EMBODIMENT

Figure 1:
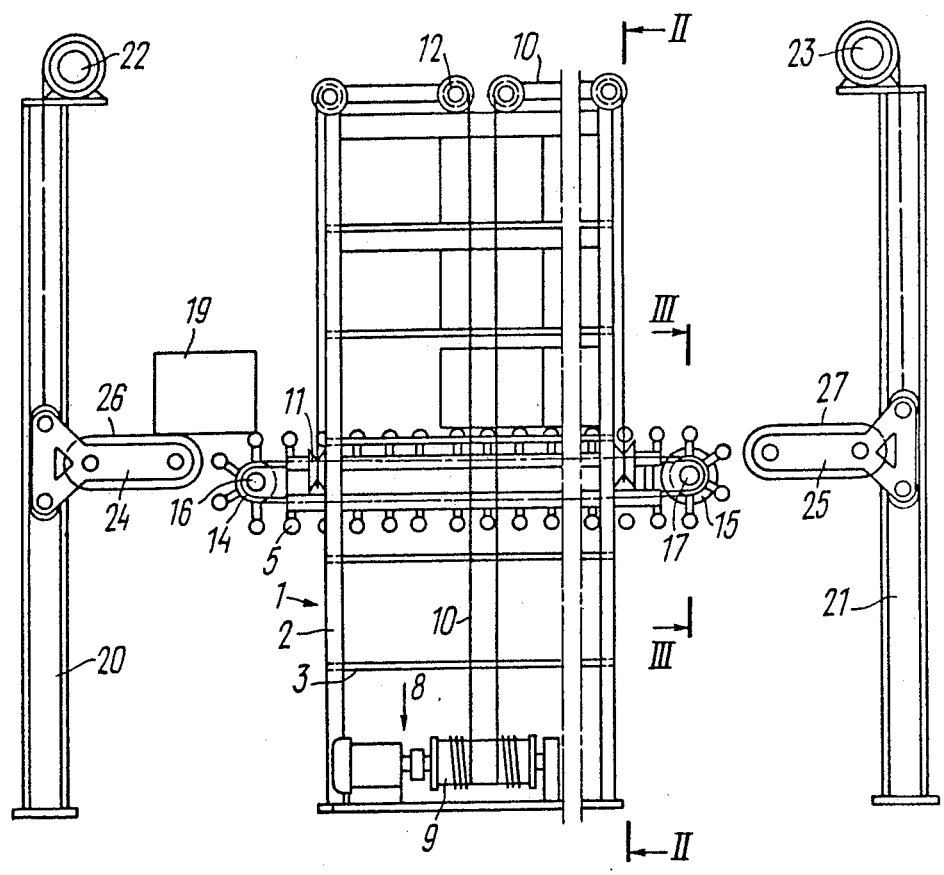
FIG. 1 is a side elevation of the disclosed storage.
Figure 2:
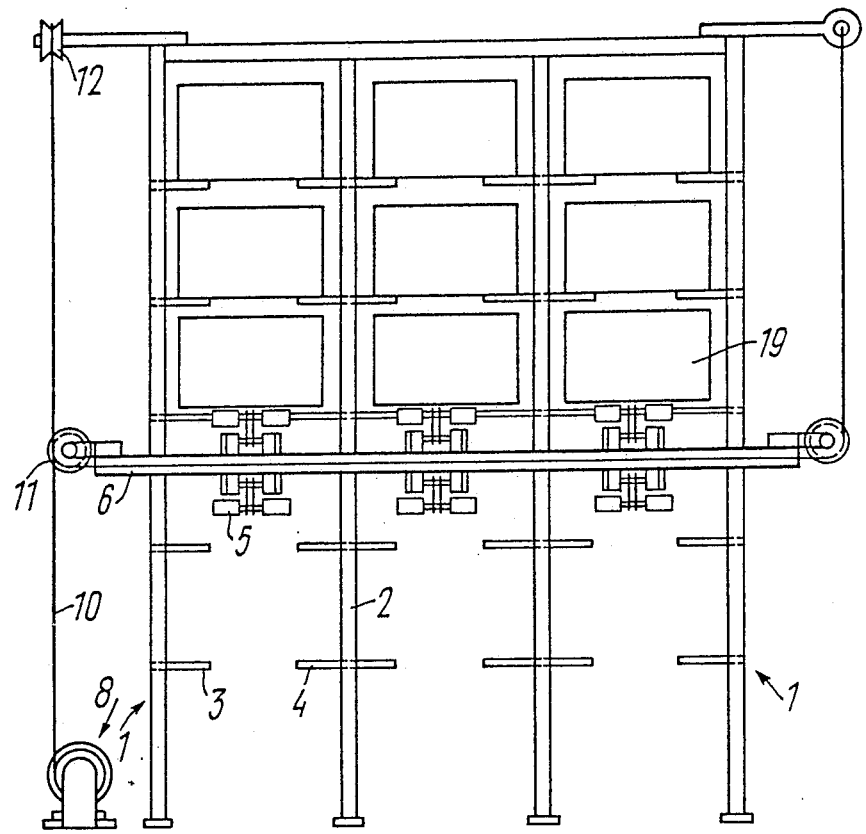
FIG. 2 is a section on line II—II of FIG. 1.
Figure 4:
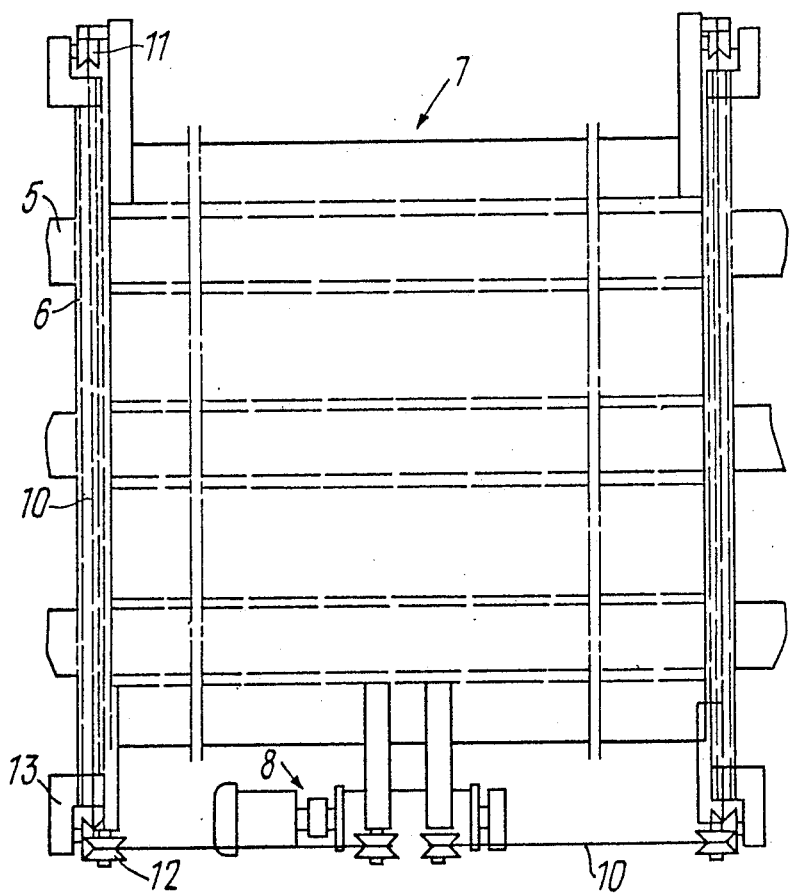
FIG. 4 is a plan view of the disclosed storage.

The storage comprises a horizontal row of racks 1 (FIGS. 1, 2) a framework 2 of which is each made up of vertical masts giving support to stacks of cantilever shelves 3, 4, facing each other with their free sides so as to form vertical passages which each accommodate a horizontal conveyor 5 either end of which extends beyond the framework. The extending ends of the frames of the conveyors 5 are interconnected with stiff members 6 so as to form—integrally with the conveyor frames—a gridwork 7 (FIG. 4) arranged to be displaced between the free sides of the shelves 3, 4 (FIG. 1) up and down the height of the storage due to a drive 8 incorporating a drum 9 and ropes 10 which pass over movable sheaves 11 and stationary ones 12. Each of the ropes 10 is anchored to the drum 9 at one end and to the rack 1 at the other end. The stiff members 6 are of tubular form (FIG. 4) and the ropes 10 are run through the bores of the tubular members 6. The movable sheaves 11 are attached to tubular members by brackets 13 and the stationary sheaves 12 are secured to the racks 1 (FIG. 1).

Figure 3:
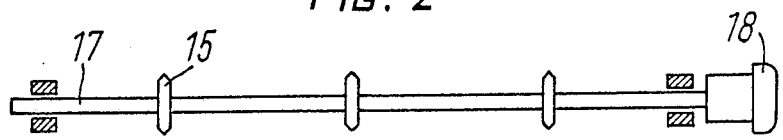
FIG. 3 is a section on line III—III of FIG. 1.

The conveyors 5 of the adjacent horizontal rows of the racks 1 are fitted with take-up sprockets 14 and drive sprockets 15 which are located outside the racks 1, fitted to common shafts 16, 17 and set into motion by a common drive 18 (FIG. 3) of any known type, e.g. an electric motor with reduction gear. To store and retrieve goods 19 (FIG. 1), use is made of means 20, 21 consisting of platforms 24, 25 which can be lif;ted and lowered by drives 22, 23 and are each equipped with storing conveyors 26 and retrieving conveyor 27, respectively.

The storage operates as follows. For loading the racks 1, a piece of goods 19 is placed on each loading conveyor 26 of the vetically-movable platfrom 24 of the means 20. Initially, i.e. when the storageis empty, the gridwork 7 is lifted on a level with the upper tier of the racks 1 so that the load-carrying belts of the conveyors 5 located in the passages between the free sides of the shelves 3, 4 protrude above the surface of these shelf sides. Setting the drive 22 into motion, the platfrom 24 is lifted so that the surfaces of the belts of the conveyors 26 are on a level with the surface of the belts of the conveyors 5. Setting the conveyors 26 and 5 into motion, the goods 19 are transferred to the shelves of the upper tier of the storage. The platform 24 is lowered for loading and the above cycle is repeated. The loading on the shelves of the upper tier goes on until the conveyors 5 at every shelf of the upper tier become loaded with unit goods from the retrieving end to the loading one. After that the gridwork 7 is lowered by the drive 8 to the next tier below and the loading goes on as described above. When the gridwork is being lowered, the conveyors 5 also go down the passages between the free sides of the shelves 3, 4 so that the goods 19 they have been loaded with are left behind on the shelves of the upper tier. When the gridwork 7 finally reaches the lowermost tier and loads this as well, the entire storage will be loaded from top to bottom.

The procedure of retrieving goods is similar to that of storing except that the conveyors 5 of the gridwork 7 cooperate with the retrieving conveyors 27 of the vertically-movable platform 25 of the retrieving means 21. On retrieving goods from a tier by means of the conveyors 5, the gridwork 7 is lifted by the drive 8 to the next tier above, whereby the belts of the conveyors 5 travel through the passages between the free sides of the shelves 3, 4 and pick up the goods 19 on being stopped at a point slightly above the surface of these shelves.

The disclosed invention may be of utility in storing uniform randomly retrievable goods, e.g. standard packages of newspapers of the same title.

We claim:

1. A unit goods storage comprising: racks; a framework of each of said racks made up of vertical masts; shelves cantilevered at one end to said vertical masts, said shelves having other ends facing each other to form vertical passages; horizontal conveyors having frames and having ends extending beyond said framework and arranged one in each of the passages; a rope and sheave system serving as a drive to cause vertical movement of said conveyors over an entire height of said framework between said other ends of the shelves; stiff tubular members interconnecting ends of said frames of the conveyors at both ends of each of the conveyors; ropes of said rope and sheave system extending through said stiff tubular members, said stiff tubular members and said frames of the conveyors defining a permanent stiff gridwork means for supporting said conveyors and said gridwork means being always located in said passages between said shelves of said racks and moved within said passages by said rope and sheave system.

* * * * *